(12) United States Patent
Ames et al.

(10) Patent No.: US 7,739,229 B2
(45) Date of Patent: Jun. 15, 2010

(54) EXPORTING AGGREGATED AND UN-AGGREGATED DATA

(75) Inventors: Glen Anthony Ames, Mountain View, CA (US); David A. Burgess, Menlo Park, CA (US); Joshua Ethan Miller Koran, Mountain View, CA (US); Sundara Raman Rajagopalan, Sunnyvale, CA (US); Amit Umesh Shanbhag, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 244 days.

(21) Appl. No.: 11/752,036

(22) Filed: May 22, 2007

(65) Prior Publication Data
US 2008/0294671 A1    Nov. 27, 2008

(51) Int. Cl.
*G06F 17/30* (2006.01)

(52) U.S. Cl. ............... 707/602; 707/604; 707/610; 707/791; 707/798; 707/802

(58) Field of Classification Search .......... 707/600–831
See application file for complete search history.

(56) References Cited

U.S. PATENT DOCUMENTS

| | | | |
|---|---|---|---|
| 5,308,058 A | 5/1994 | Mandel et al. | |
| 5,328,169 A | 7/1994 | Mandel | |
| 5,342,034 A | 8/1994 | Mandel et al. | |
| 5,358,238 A | 10/1994 | Mandel et al. | |
| 5,390,910 A | 2/1995 | Mandel et al. | |
| 5,435,544 A | 7/1995 | Mandel | |
| 5,547,178 A | 8/1996 | Costello | |
| 5,550,964 A | 8/1996 | Davoust | |
| 6,278,989 B1 | 8/2001 | Chaudhuri et al. | |
| 6,351,754 B1 | 2/2002 | Bridge, Jr. et al. | |
| 6,438,552 B1 | 8/2002 | Tate | |
| 6,499,032 B1 | 12/2002 | Tikkanen et al. | |
| 6,505,206 B1 | 1/2003 | Tikkanen et al. | |
| 6,549,910 B1 | 4/2003 | Tate | |
| 6,865,567 B1 | 3/2005 | Oommen et al. | |
| 6,907,422 B1 | 6/2005 | Predovic | |
| 7,197,513 B2 | 3/2007 | Tessman et al. | |
| 7,209,924 B2 | 4/2007 | Bernhardt et al. | |
| 7,246,014 B2 | 7/2007 | Forth et al. | |
| 7,342,929 B2 | 3/2008 | Bremler-Barr et al. | |
| 7,562,058 B2 | 7/2009 | Pinto et al. | |
| 2002/0077997 A1 | 6/2002 | Colby et al. | |
| 2003/0076848 A1 | 4/2003 | Bremler-Barr et al. | |
| 2004/0002980 A1 | 1/2004 | Bernhardt et al. | |
| 2005/0068320 A1 | 3/2005 | Jaeger | |
| 2005/0240456 A1 | 10/2005 | Ward et al. | |
| 2006/0028470 A1* | 2/2006 | Bennett et al. | .............. 345/440 |
| 2006/0036639 A1 | 2/2006 | Bauerle et al. | |

(Continued)

OTHER PUBLICATIONS

U.S. Appl. No. 11/804,233, filed May 16, 2007.

(Continued)

*Primary Examiner*—Isaac M Woo
(74) *Attorney, Agent, or Firm*—Weaver Austin Villeneuve & Sampson LLP

(57) ABSTRACT

A computer-implemented method, which comprises the following: receiving a graphical selection of a subset of data points from a set of data points, each data point representing at least one record of a dimensionally-modeled fact collection; and exporting information associated with the selected subset of data points.

14 Claims, 5 Drawing Sheets

U.S. PATENT DOCUMENTS

| | | |
|---|---|---|
| 2006/0085561 A1 | 4/2006 | Manasse et al. |
| 2007/0244849 A1 | 10/2007 | Predovic |
| 2008/0016041 A1* | 1/2008 | Frost et al. .................... 707/3 |
| 2008/0104101 A1 | 5/2008 | Kirshenbaum et al. |

OTHER PUBLICATIONS

U.S. Appl. No. 11/752,048, filed May 22, 2007.
U.S. Appl. No. 11/804,196, filed May 17, 2007.
Office Action from U.S. Appl. No. 11/804,196, mailed May 26, 2009.
Office Action from U.S. Appl. No. 11/752,048, dated Sep. 22, 2009.
Final Office Action from U.S. Appl. No. 11/804,196, dated Nov. 20, 2009.
K. L. Wu, P.S. Yu, "Range-Based Bitmap Indexing for High Cardinality Attributes with Skew," Computer Software and Applications Conference, Annual International, pp. 61, 22nd International Computer Software and Application Conference, 1998.
Office Action from U.S. Appl. No. 11/804,233, dated Mar. 8, 2010.

* cited by examiner

EXPORTING AGGREGATED AND UN-AGGREGATED DATA

BACKGROUND OF THE INVENTION

1. Field of the Invention

The present invention relates to exporting a subset of multi-dimensional records from a dataset, where the dataset represents a dimensionally-modeled fact collection. More specifically, the present invention relates to causing one or more multi-dimensional records to be graphically selected, and exporting the selected multi-dimensional records either in aggregated or in un-aggregated or raw form.

2. Background of the Invention

When interacting with and/or analyzing large datasets, where, for example, each dataset may contain a million or more multi-dimensional records, it can be difficult, impractical, and even impossible for users to consider the entire datasets all at once. Instead, users often prefer to focus on smaller subsets of records. Sometimes, users may select a subset of records that are related to a particular analysis from a large dataset. Other times, users may wish to distinguish normal records from anomalous or erroneous ones.

One way for users to select a subset of records of particular interest from a large dataset is to display all the multi-dimensional records from the dataset textually, such as in a spread sheet, and then select those records of interest manually. However, this process may be very tedious and time consuming. In fact, it may be impractical and even impossible to display a million or more multi-dimensional records textually. And even if such large number of records could be displayed textually, it would be almost impossible for users to go through the entire dataset in order to locate and select those records of particular interest in any reasonable amount of time. In addition, understanding the inter-relationships of these records, such as determining which records are related to each other for a particular type of analysis, may be very difficult when the records are displayed textually.

Accordingly, what are needed are systems and methods to address the above-identified problems.

SUMMARY OF THE INVENTION

Broadly speaking, the present invention relates to exporting a selected subset of multi-dimensional records from a dataset in aggregated and/or un-aggregated form, where the dataset represents a dimensionally-modeled fact collection.

In one embodiment, a computer-implemented method is provided, which comprises the following: receiving a graphical selection of a subset of data points from a set of data points, each data point representing at least one record of a dimensionally-modeled fact collection; and exporting information associated with the selected subset of data points. The term "export" as used here means any method of distinguishing the selected records from the unselected records.

In another embodiment, a computer-implemented method is provided, which comprises the following: receiving a graphical selection of a subset of data points from a set of data points, each data point representing at least one record of a dimensionally-modeled fact collection; receiving an aggregation specification; aggregating a subset of records corresponding to the selected subset of data points in accordance with the aggregation specification; and exporting the subset of records in aggregated form.

In yet another embodiment, a computer-implemented method is provided, which comprises the following: receiving a graphical selection of a subset of data points from a set of data points, each data point representing at least one record of a dimensionally-modeled fact collection; and exporting a subset of records corresponding to the selected subset of data points in un-aggregated form.

These and other features, aspects, and advantages of the invention will be described in more detail below in the detailed description and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
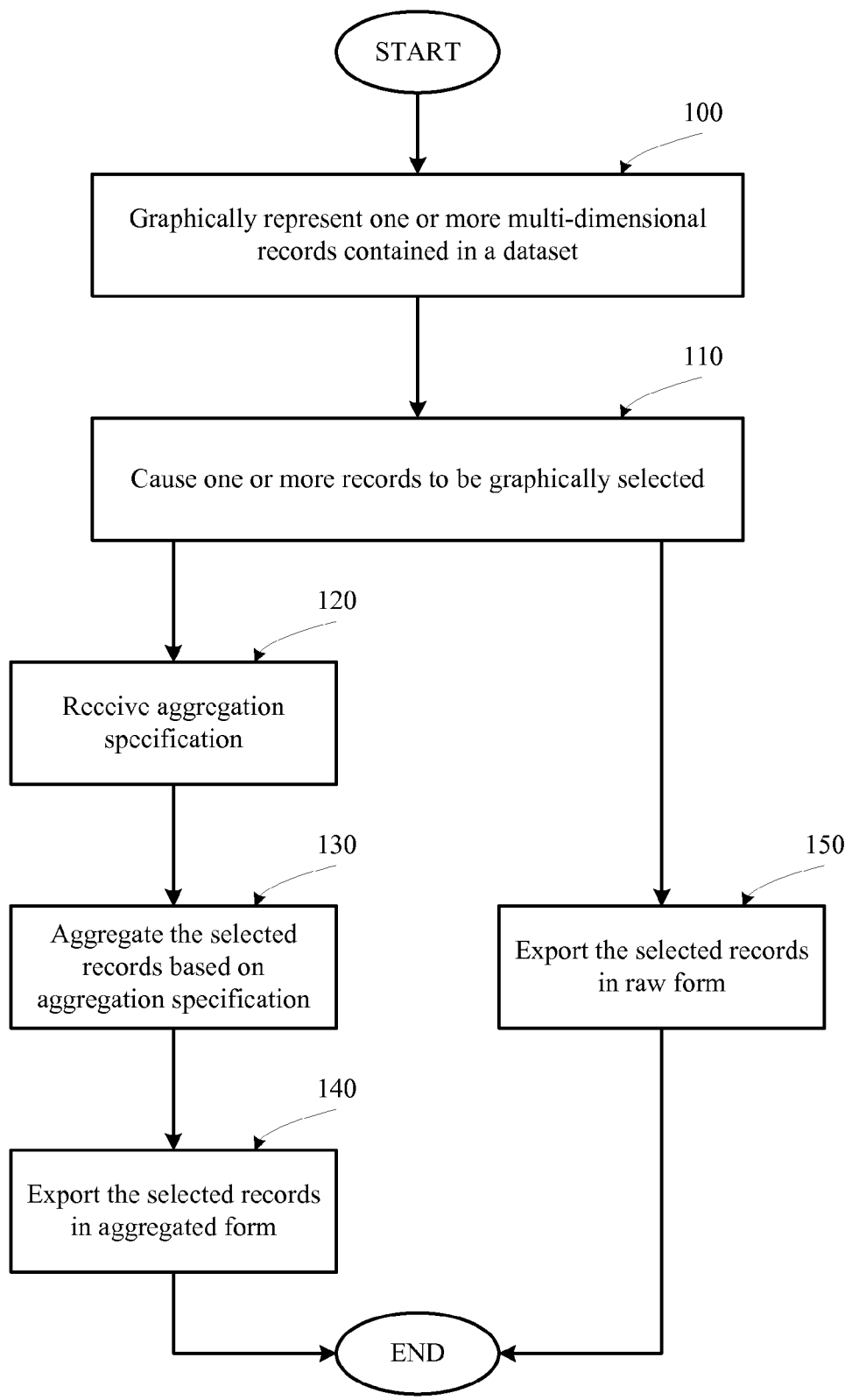
FIG. 1 is a flowchart of a method that enables a user to cause a subset of multi-dimensional records to be exported.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. In addition, while the invention will be described in conjunction with the particular embodiments, it will be understood that it is not intended to limit the invention to the described embodiments. To the contrary, it is intended to cover alternatives, modifications, and equivalents as may be included within the spirit and scope of the invention as defined by the appended claims.

Businesses and other types of institutions or entities often collect factual-based data for various purposes, such as analyzing market trends, planning for business growth, conducting targeted advertisements, etc. For example, a business may collect various types of information about its customers, such as the customers' age, gender, spending habit, buying power, preferred products, etc. Alternatively, a business may collect factual data about individual business transactions. Often, the amount of factual data collected may be quite large. It is not unusual for a large dataset to contain one million or more multi-dimensional records, where each record represents a customer, a business transaction, an entity, etc. Each record may comprise multiple data values, where each data value represents a particular piece of factual information within the record.

For ease of use, the records in a dataset may be organized as, or otherwise accessible, according to a dimensional data model, such as a table. The following is a sample representation of such a table.

TABLE 1

| Customer ID | Age | Gender | Geographical Location | Annual Income | Monthly Spending |
|---|---|---|---|---|---|
| A | 31 | M | CA | $75,000 | $1,200 |
| B | 45 | F | CA | $110,000 | $2,000 |
| C | 27 | F | NY | $65,000 | $1,500 |
| D | 18 | M | WA | $32,000 | $1,300 |
| E | 55 | F | CO | $50,000 | $2,200 |

In the example shown in Table 1, each row of the table represents a single record, and in this case, each record represents a customer, identified by a unique customer ID (as shown in the first column). Alternatively in another example, each record/row may be a business transaction or an entity. Each column of the table represents a different dimension of the records, such as a category or a type of data (e.g., age, gender, monthly income, etc.). Inside the cells of the table are the specific data values, each value representing a particular piece of factual information about the corresponding record (e.g., customer or transaction) in a corresponding dimension (e.g., category or characteristic), and a data value may either be a text, a number, or a combination of both. For example, the first row of Table 1 describes a customer whose customer ID is "A." Customer "A" is aged 31, a male, located in California, and has an annual income of $75,000 and a monthly spending amount of $1,200. The entire table is a collection of facts, and such collection of facts may be referred to as a dimensionally-modeled fact collection.

When working with large datasets, where, for example, each dataset may comprise a million or more such multi-dimensional records, it may be impractical, even impossible, to display all the multi-dimensional records textually. Instead, it can be more convenient to represent the records graphically using various graphical formats depending on user preferences. For example, a scatter plot may be used to graphically represent the records shown in Table 1, with each axis representing a particular dimension (column) and each data point representing at least one record (row). Users may then interact with the data points in the scatter plot graphically (e.g., using a mouse or other method to interact with the graphical display), such as selecting a subset of data points of particular interest, which, in effect, causes the corresponding records represented by these data points to be selected. Furthermore, representing the records graphically may enable the users to quickly identify related records, anomalous records, or records of particular interest, so that users may quickly select a subset of records for further analysis.

The inventors have realized that it would be useful to enable the users to easily and quickly identify or select graphically displayed data points of interest from a large master dataset. Thereafter, the records represented by the selected data points may be exported in either aggregated or un-aggregated format for further analysis.

FIG. 1 is a flowchart of a method that enables a user to cause a subset of multi-dimensional records to be exported. At 100, one or more multi-dimensional records contained in a large dataset are graphically represented. The actual graphical format used to represent the records may vary depending on user preferences. The graphical representation may help the users to easily and quickly determine the inter-relationships of the records displayed. For example, the records may be graphically represented using scatter plots, bar charts, pie charts, or other graphical formats. Axes, colors, sizes, shapes, and other graphical characteristics may be used to graphically represent different dimensions or categories (e.g. different columns of Table 1) of the records. The records may be graphically displayed in their raw format or in aggregated format depending on user preferences. Users may choose to display all the records (e.g., rows of Table 1) of the dataset or a portion of the records. Similarly, users may choose to display all the dimensions (e.g., columns of Table 1) of the records or a subset of the dimensions.

Using a scatter plot as an example, the axes may represent the dimensions (e.g., columns of a table) and the data points may represent the records (e.g., rows of a table). Additional graphical characteristics, such as color, size, shape, label, etc., may also be used to represent additional dimensions. The records (i.e., the information comprised within the records) may be displayed in raw (i.e., un-aggregated) format or in aggregated format. If the records are displayed in raw form, then each data point in the scatter plot represents one record. If the records are displayed in aggregated form, then each data point represents at least one record aggregated together.

In order to allow more flexible visualization of the large dataset, in one embodiment, by default, initially all the records in the dataset are displayed, represented by the data points, with each data point representing at least one record. The users may then conduct visual inspections of the records easily and quickly in order to select those data points (i.e., records) of particular interest.

Once the multi-dimensional records are displayed graphically, at 110, a user may graphically select one or more records of interest. Since the records are represented graphically, for example, as in a scatter plot where each data point represents at least one record, graphically selecting records of interest may be done by clicking on the corresponding individual data points representing those records with a mouse while holding down the control key or selecting a group of data points by holding down the left mouse button and dragging the mouse over the group of data points of interest. Since each data point represents at least one multi-dimensional record, by selecting the data point, the user in effect has caused the corresponding record(s) to be selected. Other methods of selecting one or more graphically displayed graphical objects may also be used, depending on the actual graphical format employed to display the dataset.

After the records (i.e., data points) of interest have been selected, the user may choose to export the selected records in aggregated or un-aggregated form. If the user chooses to export the selected records in aggregated form, then at 120, the user has the option of specifying what type of aggregation is to be performed on the selected records, and how the records are to be divided into groups for aggregation. For example, each dimension of the selected records may be aggregated the same or differently.

The specific type of aggregation may vary depending on user preferences. For example, the user may choose from aggregation types such as sum (the sum of all selected records), count (the total number of selected records), median (the median value among the selected records), minimum (the minimum value among the selected records), maximum (the maximum value among the selected records), mean (the mean value of among the selected records), count greater than 0 (the total number of selected records whose value is greater than 0), etc.

At 130, the selected records may be aggregated based on the user's aggregation specification. At 140, the aggregated records may be exported in a variety of format. The term "export" as used here means any method of distinguishing the selected records from the unselected records. For example, the selected records may be exported into a table, a spreadsheet, a database, etc., depending on user preferences. The selected records may even be left in place among the unselected records, with an indicator, such as a flag, indicating to the user which record is selected and which record is not selected.

Alternatively, if the user chooses to export the selected records in un-aggregated or raw form, then no aggregation is needed. At 150, the selected records may be exported in their native/raw form, again in a variety of formats, such as into a table, a spread sheet, a database, etc., depending on user preferences. Thereafter, the user may focus on the selected and exported subset of records for further analysis.

Regardless of whether the user chooses to export the selected records in aggregated or un-aggregated form, the selected records may be exported with all of their dimensions or a subset of dimensions. In the example shown in Table 1, the user may choose to export all the columns shown in Table 1 for the selected records, or select only a subset of the columns to be exported for the selected records.

As will be understood, 100, 110, 120, 130, 140, and 150 may be implemented as a software program. For example, an existing graphical library, such as OpenGL or Java 3D, may be utilized in displaying the data points in various graphical formats and providing the necessary graphical and image functionalities. Data structures such as arrays or sets may be used to represent the records in the large dataset as well as the selected subsets. For example, a new array or set may be used to represent each subset of selected data points and/or records.

In addition, the software program may provide a user interface that enables the users to interact with the graphically displayed records and/or to specify whether to export the selected records in aggregated or un-aggregated form, and if the records are to be exported in aggregated form, what type of aggregation is to be performed. The actual design and implementation of such a user interface often depends on user and product design preferences. The layout of the user interface may take into consideration the functionalities of the software as well as factors such as easy of use, aesthetics, robustness, etc. For example, a menu may list all the available types of aggregations and the users may choose a specific type of aggregation to be performed on the selected subset of records from the menu.

It may be helpful to further illustrate FIG. 1 with a specific example. The following Table 2 is a sample representation of a large dataset comprising millions of multi-dimensional records. To simplify the description, only a small portion of the records are actually shown in Table 2.

TABLE 2

| Record ID | Age | Gender | Geographical Location | Monthly Income | Monthly Spending |
|---|---|---|---|---|---|
| 0,000,001 | 38 | M | CT | 2,750 | 1,200 |
| 0,000,002 | 29 | F | CA | 7,750 | 4,000 |
| 0,000,003 | 70 | M | SD | 7,000 | 1,000 |
| ... | | | | | |
| 0,023,962 | 48 | M | FL | 9,000 | 4,000 |
| 0,023,963 | 38 | F | FL | 8,750 | 5,000 |
| ... | | | | | |
| 0,553,015 | 75 | F | NY | 14,750 | 8,000 |
| 0,553,016 | 42 | M | WA | 8,000 | 5,300 |
| 0,553,017 | 28 | M | IL | 6,750 | 4,000 |
| 0,553,018 | 68 | F | KY | 4,500 | 2,500 |
| ... | | | | | |
| 1,512,528 | 43 | F | CO | 9,250 | 2,200 |
| 1,512,529 | 22 | F | NJ | 6,500 | 3,000 |
| ... | | | | | |
| 2,164,274 | 60 | M | TX | 6,750 | 500 |
| ... | | | | | |

TABLE 2-continued

| Record ID | Age | Gender | Geographical Location | Monthly Income | Monthly Spending |
|---|---|---|---|---|---|
| 3,513,529 | 34 | M | TX | 6,500 | 5,500 |
| 3,513,530 | 8 | F | OR | 11,500 | 5,000 |
| 3,513,531 | 50 | M | MA | 12,250 | 7,000 |

Again, in the sample dataset shown Table 2, each row represents a record, and each column represents a dimension within the records so that each record comprises multiple dimensions. Each record represents a customer and may be identified by a unique record ID, as shown in the first column. The second column shows the customers' age. The third column shows the customers' gender. The fourth column shows the customers' geographical location in terms of which state the customers are located. The fifth column shows the customers' monthly income. And the sixth column shows the amount the customers spend in a month.

Figure 2A:
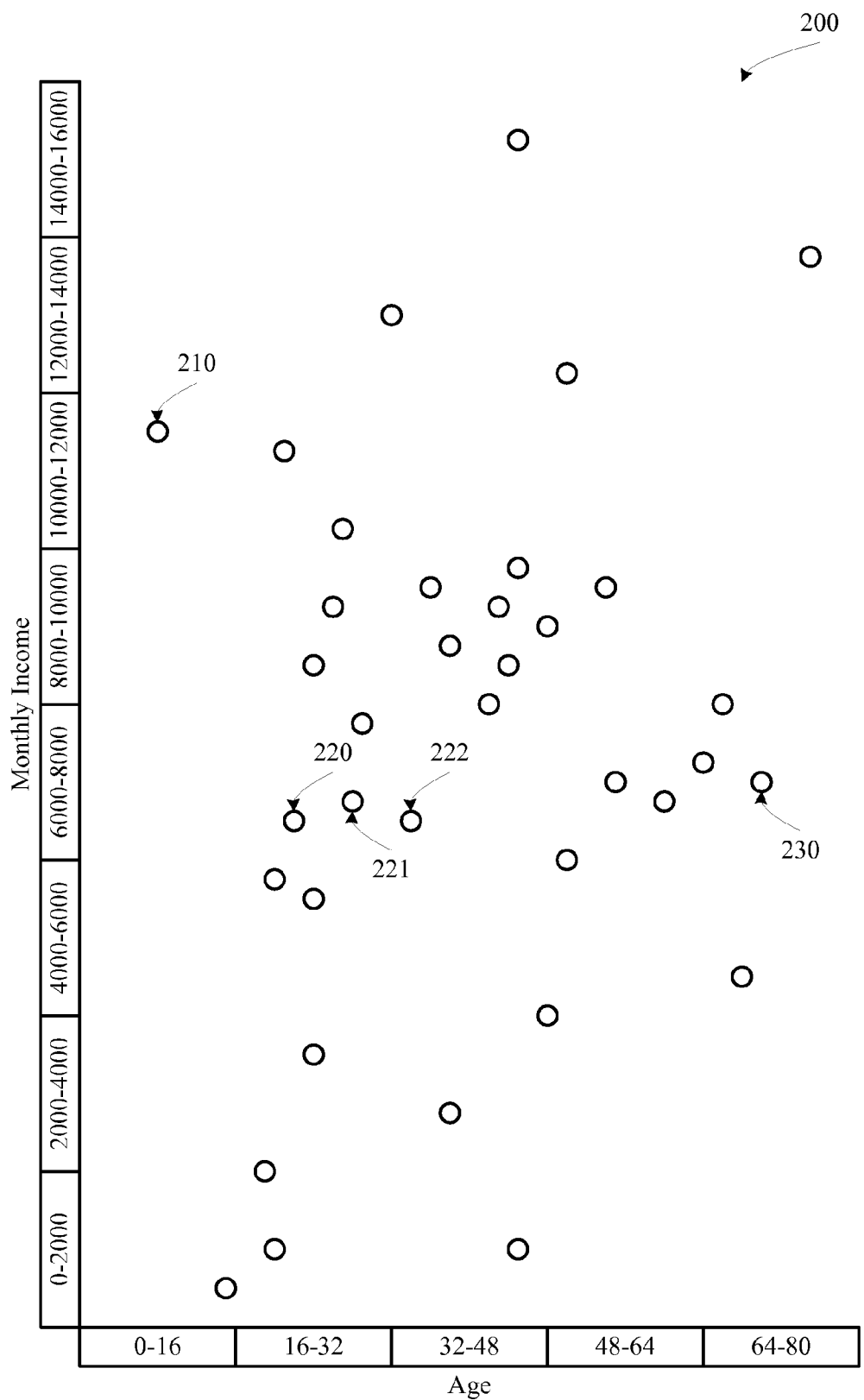
FIG. 2A illustrates a dataset graphically represented using a scatter plot.

FIG. 2A illustrates the portion of records of the dataset shown in Table 2 graphically represented using a scatter plot. In this example, the scatter plot is used by way of illustration. And to simplify the description, only a two-dimensional scatter plot is shown. In FIG. 2A, the x-axis corresponds to the "Age" column and the y-axis corresponds to the "Monthly Income" column of Table 2. The records are displayed in un-aggregated form. Thus, each data point in FIG. 2A provides an indication of a customer's age versus that customer's monthly income.

Alternatively, when desired, the user may choose to represent additional table columns (dimensions) in the plot. For example, the user may select the z-axis to correspond to the "Monthly Spending" column, making the plot into a three-dimensional scatter plot. Colors may be used to represent the "Geographical Location" column, using a different color to represent each state. Labels may be used to indicate the "Gender" column. And, so on. Other types of graphical formats may also be used to graphically display the dataset based on user preferences.

In this example, the records are displayed in un-aggregated or raw form. Thus, each data point in the scatter plot represents one record. Alternatively, when desired, the user may choose to display the records in aggregated form, in which case each data point in the scatter plot may represent multiple records.

Graphically representing the multi-dimensional records may help the user identify records (i.e., data points) of interest or anomalous records quickly and easily. For example, the user may readily find that data point 210 is anomalous, since it is unlikely for an eight-year-old child to earn a monthly income of $11,500. If the user only had a textual display of the records to work with, the user would have to go through the entire dataset, checking thousands, even millions of rows of data to locate anomalous data values. And even then, it would be very easy to overlook some anomalous data values. The errors in such records may be caused by a number of reasons, such as software bugs, erroneous inputs, etc. The user may choose to discard these anomalous records before conducting further analysis.

The user may also select a subset of data points (i.e., records) of particular interest. The selected data points may or may not be spatially contiguous in the scatter plot. For example, the user may select data points 220, 221, 222, which are spatially closely located. The user may also select data point 230, which is spatially located in a different location. In other words, the user may select any data point displayed in the scatter plot.

Figure 2B:
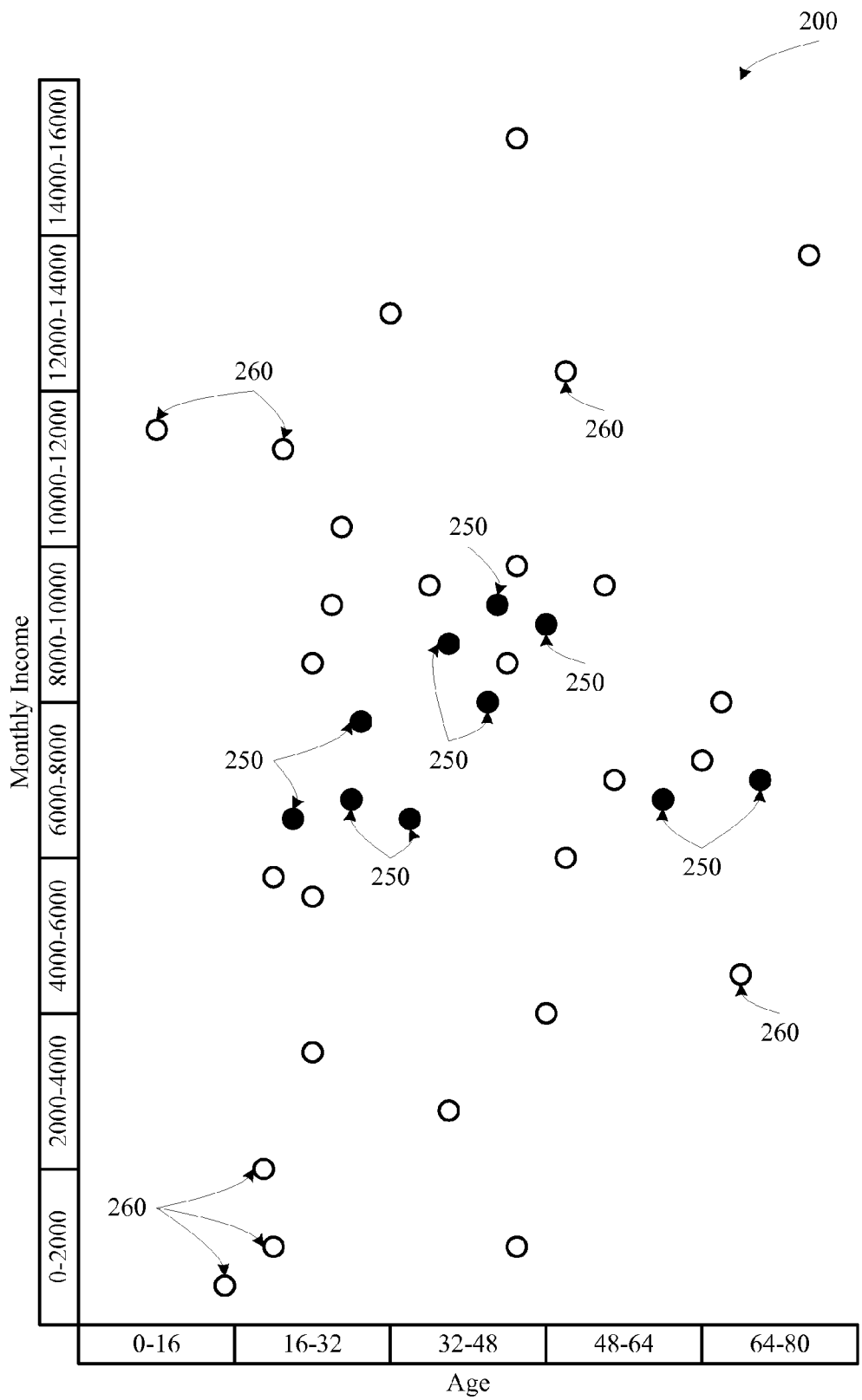
FIG. 2B illustrates the dataset shown in FIG. 2A with a selected subset of data points, where each data point represents at least one multi-dimensional record from the dataset.

FIG. 2B illustrates the dataset shown in FIG. 2A with a selected subset of data points, where each data point represents at least one multi-dimensional record from the dataset. By way of illustrations, 10 data points 250 are selected. To distinguish selected data points 250 from unselected data points 260, in one embodiment, the selected data points 250 may be displayed in a different graphical form from the unselected data points 260. For example, the selected data points 250 may be highlighted, displayed in a different color, shape, or size, marked with a special label, etc.

Once the data points have been graphically selected, the records represented by the selected data points may be exported in aggregated or un-aggregated form. For example, the records in Table 2 corresponding to the selected data points may be identified. Table 3 below shows the 10 rows (i.e., records) from Table 2 that correspond to the selected 10 data points 250 shown in FIG. 2B.

TABLE 3

| Customer ID | Age | Gender | Geographical Location | Monthly Income | Monthly Spending |
| --- | --- | --- | --- | --- | --- |
| 0,000,002 | 29 | F | CA | $7,750 | $4,000 |
| 0,000,003 | 70 | M | SD | $7,000 | $1,000 |
| 0,023,962 | 48 | M | FL | $9,000 | $4,000 |
| 0,023,963 | 38 | F | FL | $8,750 | $5,000 |
| 0,553,016 | 42 | M | WA | $8,000 | $5,300 |
| 0,553,017 | 28 | M | IL | $6,750 | $4,000 |
| 1,512,528 | 43 | F | CO | $9,250 | $2,200 |
| 1,512,529 | 22 | F | NJ | $6,500 | $3,000 |
| 2,164,274 | 60 | M | TX | $6,750 | $500 |
| 3,513,529 | 34 | M | TX | $6,500 | $5,500 |

If the user chooses to export the records in their un-aggregated or raw form, then the 10 rows in Table 3 may be exported as they are. The actual format of the exported data may vary depending on user preferences. For example, the exported data may be saved as a spread sheet, into a file, into a database, etc.

On the other hand, if the user chooses to export the records in aggregated form, the user may specify what type of aggregation is to be performed on the selected records. For example, the user may wish to know the average age of the 10 selected customers. Thus, the user may specify to export the average value of the "Age" column, which, in this example, is 41.4 years old. The user may wish to know the number of males in the 10 selected customers. Thus, the user may specify to export the male count for the "Gender" column, which, in this example, is 6 males. The user may wish to know the total number of different states in which the 10 selected customers are located. Thus, the user may specify to export the state count for the "Geographical Location" column, which, in this example, is 8 different states. The user may wish to know the maximum monthly income among the 10 selected customers. Thus, the user may specify to export the maximum value of the "Monthly Income" column, which, in this example, is $9,250. Or, the user may wish to know the sum of the monthly spending amounts of the 10 selected customers. Thus, the user may specify to export sum for the "Monthly Spending" column, which, in this example, is $34,500. Table 4 shows the 10 selected records exported in aggregated form as described above.

TABLE 4

| Customer ID | Age (average) | Gender (male count) | Geographical Location (state count) | Monthly Income (maximum) | Monthly Spending (sum) |
| --- | --- | --- | --- | --- | --- |
| N/A | 41.4 | 6 males | 8 states | $9,250 | $34,500 |

The user may choose to export any type of aggregated value for the selected records. The user may specify the same type of aggregation for all dimensions (i.e., columns) or different types of aggregation for each dimension (i.e., columns) of the selected records. In addition, the user may choose to aggregate all selected records together, or divide the selected records into groups for aggregations based on any user-specified criteria.

For example, the user may choose to divide the selected records based on "gender" and specify to aggregate all male customers together and all female customers together. In this case, the aggregation base is male and female. Continuing with the above example, the average age for the 6 male customers is 47, and the average age for the 4 female customers is 33. The 6 male customers are from 5 different states, and the 4 female customers are from 4 different states. The maximum monthly income for the 6 male customers is $9,000, and the maximum monthly income for the 4 female customers is $9,250. The sum of monthly spending for the 6 male customers is $20,300, and the sum of monthly spending for the 4 female customers is $14,200. Table 5 shows the 10 selected records exported in aggregated form and aggregated based on gender.

TABLE 5

| Customer ID | Age (average) | Gender | Geographical Location (state count) | Monthly Income (maximum) | Monthly Spending (sum) |
| --- | --- | --- | --- | --- | --- |
| N/A | 47 | M | 5 states | $9,000 | $20,300 |
| N/A | 33 | F | 4 states | $9,250 | $14,200 |

In one embodiment, in addition to the graphical representation of the records as shown in FIGS. 2A and 2B, a user interface may be designed and implemented to help the user to specify the aggregation specification, which includes the aggregation base and the aggregations types for the dimensions. The actual design and implementation of such a user interface often depends on user preferences and/or design requirements. The layout of the user interface may take into consideration the functionalities of the software as well as factors such as easy of use, intuitiveness, aesthetics, robustness, etc.

Figure 3:
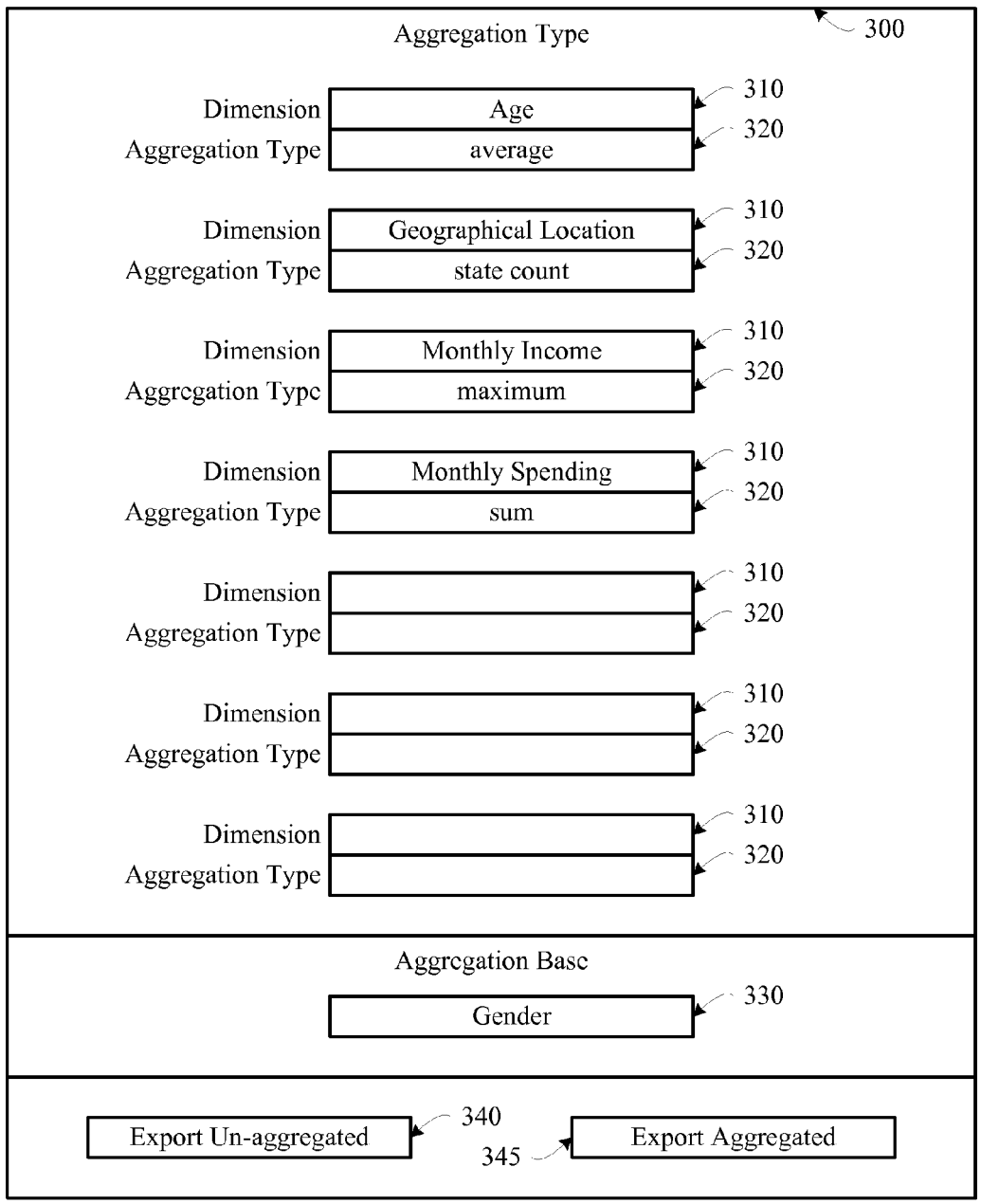
FIG. 3 illustrates a sample user interface that enables users to specify aggregation specification and exporting form.

FIG. 3 illustrates a sample user interface that enables users to specify aggregation specification and exporting form. This particular example of the user interface has three parts. First, the user may enter an aggregation type 320 for each of the dimensions 310 of the selected records. In this example, the user may enter the dimension name and aggregation type for that dimension in the appropriate fields 310, 320. In other examples, alternative types of user interface components, such as pull-down menu, check box, etc., may also be employed to enable the user to specify the necessary information.

Next, the user may enter an aggregation base 330. Again, alternative types of user interface components may be employed to implement this field. Finally, two buttons 340, 345 are provided for the user to choose which form of the selected records is to be exported. If the user wishes to export the selected records in un-aggregated form, then the user may simply click button 340. On the other hand, if the user wishes to export the selected records in aggregated form, then the user may simply click button 345. Alternative types of user interface components may be employed to implement this field as well.

Figure 4:
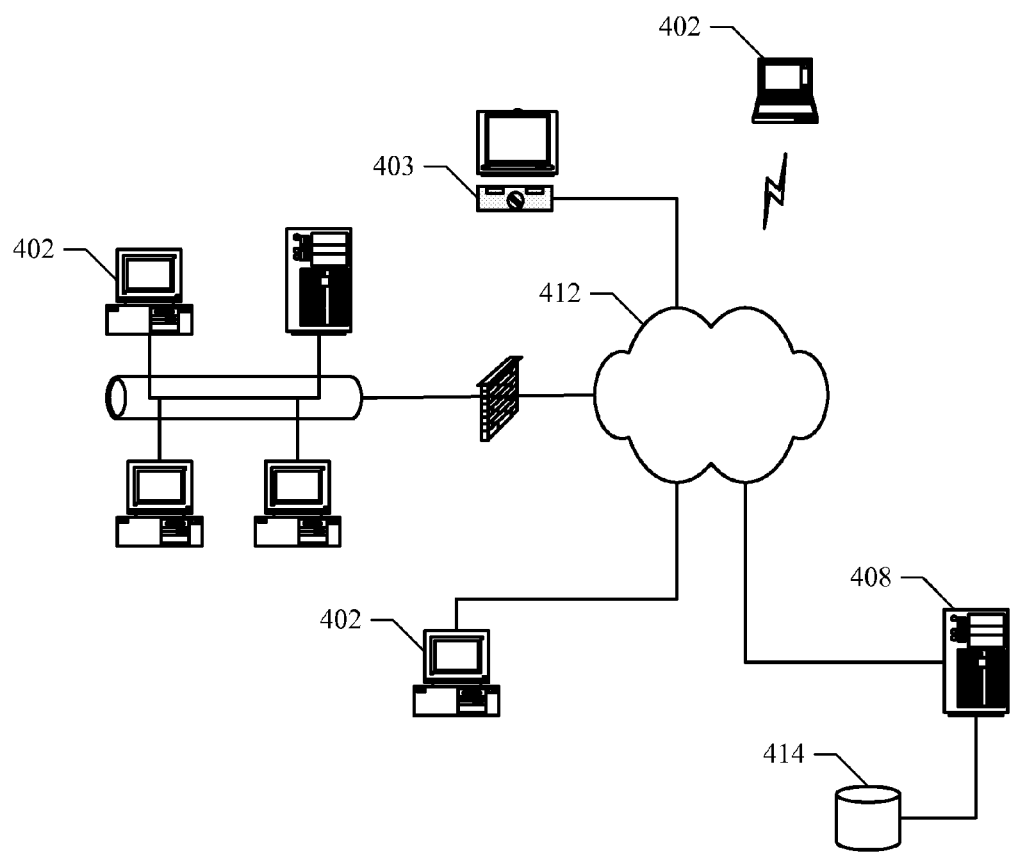
FIG. 4 is a simplified diagram of a network environment in which specific embodiments of the present invention may be implemented.

The method described above in FIG. 1 may be carried out, for example, in a programmed computing system. FIG. 4 is a simplified diagram of a network environment in which specific embodiments of the present invention may be implemented. The various aspects of the invention may be practiced in a wide variety of network environments (represented by network 412) including, for example, TCP/IP-based networks, telecommunications networks, wireless networks, etc. In addition, the computer program instructions with which embodiments of the invention are implemented may be stored in any type of computer-readable media, and may be executed according to a variety of computing models including, for example, on a stand-alone computing device, or according to a distributed computing model in which various of the functionalities described herein may be effected or employed at different locations.

According to various embodiments, the multi-dimensional records that belong to the large datasets may be stored in a database 414. The exported selected records may also be stored in the same database 414, or the exported selected records may be saved into a file on the user's computer 402. Users may access the datasets via the network using different methods, such as from computers 402, 403 connected to the network 412.

The software program implementing various embodiments may be executed on the server 408. Alternatively, the software program may be executed on the users' computers 402, 403. The graphical representation of the records points may be displayed on the users' computer screens, and the users may interact with the graphically represented records, such as data points in a scatter plot, through the user interface provided by the software program.

While this invention has been described in terms of several preferred embodiments, there are alterations, permutations, and various substitute equivalents, which fall within the scope of this invention. It should also be noted that there are many alternative ways of implementing the methods and apparatuses of the present invention. It is therefore intended that the following appended claims be interpreted as including all such alterations, permutations, and various substitute equivalents as fall within the true spirit and scope of the present invention.

What is claimed is:

1. A computer-implemented method of operating on records of a dimensionally-modeled fact collection, comprising:
    receiving a graphical selection of a subset of data points from a set of displayed data points, each displayed data point representing at least one record of a dimensionally-modeled fact collection by being graphically displayed relative to at least two axes of a display, each axis of the display representing a particular dimension, and each data point representing the at least one record such that the position of the data point relative to each axis is indicative of the value of the at least one record at the dimension represented by said each axis; and
    exporting information associated with the selected subset of data points,
    wherein exporting information associated with the selected subset of data points comprises:
        in conjunction with the graphical selection of a subset of data points from a set of displayed data points, receiving an aggregation specification;
        aggregating a subset of records corresponding to the selected subset of data points in accordance with the aggregation specification; and
        exporting the subset of records in aggregated form.

2. The computer-implemented method, as recited in claim 1, wherein the aggregation specification comprises an aggregation base that defines at least one group into which the records are divided for aggregation and at least one aggregation type.

3. The computer-implemented method, as recited in claim 2, wherein the at least one aggregation type is at least one type selected from the group consisting of maximum, minimum, mean, sum, and count.

4. The computer-implemented method, as recited in claim 2, wherein aggregating a subset of records corresponding to the selected subset of data points in accordance with the aggregation specification comprises aggregating each of the plurality of dimensions of the subset of records based on the aggregation base and a corresponding aggregation type.

5. The computer-implemented method, as recited in claim 1, wherein exporting information associated with the selected subset of data points further comprises:
    exporting the subset of records corresponding to the selected subset of data points in un-aggregated form.

6. The computer-implemented method, as recited in claim 1, further comprising:
    graphically distinguishing the selected subset of data points from unselected data points of the set of data points.

7. The computer-implemented method, as recited in claim 1, further comprising:
    graphically representing the set of displayed data points.

8. A computer program product comprising a computer-readable medium having a plurality of computer program instructions stored therein, which are operable to cause at least one computing device to, in order to operate on records of a dimensionally-modeled fact collection:
    receive a graphical selection of a subset of data points from a set of displayed data points, each displayed data point representing at least one record of a dimensionally-modeled fact collection by being graphically displayed relative to at least two axes of a display, each axis of the display representing a particular dimension, and each data point representing the at least one record such that the position of the data point relative to each axis is indicative of the value of the at least one record at the dimension represented by said each axis; and
    export information associated with the selected subset of data points,
    wherein for exporting information associated with the selected subset of data points, the computer program instructions are further operable to cause the at least one computer device to:
    receive an aggregation specification in conjunction with the graphical selection of a subset of data points from a set of displayed data points;
    aggregate a subset of records corresponding to the selected subset of data points in accordance with the aggregation specification; and
    export the subset of records in aggregated form.

9. The computer program product, as recited in claim 8, wherein the aggregation specification comprises an aggregation base that defines at least one group into which the records are divided for aggregation and at least one aggregation type.

10. The computer program product, as recited in claim 9, wherein the at least one aggregation type is at least one type selected from the group consisting of maximum, minimum, mean, sum, and count.

11. The computer program product, as recited in claim 9, wherein for aggregating a subset of records corresponding to the selected subset of data points in accordance with the aggregation specification, the computer program instructions are further operable to cause the at least one computer device to aggregate each of the plurality of dimensions of the subset of records based on the aggregation base and a corresponding aggregation type.

12. The computer program product, as recited in claim 8, wherein for exporting information associated with the selected subset of data points, the computer program instructions are further operable to cause the at least one computer device to:
    export the subset of records corresponding to the selected subset of data points in un-aggregated form.

13. The computer program product, as recited in claim 8, wherein the computer program instructions are further operable to cause the at least one computer device to:
    graphically distinguish the selected subset of data points from unselected data points of the set of data points.

14. The computer program product, as recited in claim 8, wherein the computer program instructions are further operable to cause the at least one computer device to:
    graphically represent the set of displayed data points.

\* \* \* \* \*